United States Patent [19]
Hayashi

[11] Patent Number: 6,067,174
[45] Date of Patent: May 23, 2000

[54] IMAGE PROCESSOR CONSTRUCTION HAVING AN INBOARD CARRIER DRIVING MOTOR

[75] Inventor: Eiichi Hayashi, Ohmiya, Japan

[73] Assignee: Fuji Photo Optical Co., Ltd., Japan

[21] Appl. No.: 09/038,023

[22] Filed: Mar. 11, 1998

[30] Foreign Application Priority Data

Mar. 11, 1997 [JP] Japan .................................. 9-072794

[51] Int. Cl.⁷ .................................................. H04N 1/04
[52] U.S. Cl. .......................... 358/497; 494/498; 494/474
[58] Field of Search .................... 358/474, 494, 358/497, 498

[56] References Cited

U.S. PATENT DOCUMENTS

| | | | |
|---|---|---|---|
| 4,965,638 | 10/1990 | Hediger | 358/497 |
| 5,012,354 | 4/1991 | Tsuchiya | 358/474 |
| 5,159,469 | 10/1992 | Takagi | 358/497 |
| 5,570,206 | 10/1996 | Yoshinaga | 358/497 |
| 5,760,924 | 6/1998 | Takahara et al. | 358/474 |
| 5,845,180 | 12/1998 | Tsai | 358/497 |

*Primary Examiner*—Joseph Mancus
*Assistant Examiner*—Hien Truong
*Attorney, Agent, or Firm*—Price, Heneveld, Cooper DeWitt & Litton

[57] ABSTRACT

An improved image processor construction is disclosed in which a carrier driving electric motor is located in a housing of the image processor. Generally, a carrier mechanism is driven by an electric motor to scan an original and thereby to read an image on the original. According to the invention, the electric motor is disposed within a housing of the image processor so that any portions projecting outward from the housing can be eliminated and an outer size of the image processor can be correspondingly reduced. More specifically, a housing of the image processor includes a bottom plate having a downward recess and the electric motor is disposed within this downward recess. A loop of driving belt is draped on a driving pulley fixed around an output shaft of the electric motor, on one end, and on the longitudinal middle point of a driving shaft, on the other end, so as to transmit a rotation force of the electric motor to the driving shaft. In this manner, no part of the electric motor projects outward from the housing and the outer size of the housing can be correspondingly reduced.

17 Claims, 4 Drawing Sheets

IMAGE PROCESSOR CONSTRUCTION HAVING AN INBOARD CARRIER DRIVING MOTOR

BACKGROUND OF THE INVENTION

1. Field of the Invention

This invention relates to an image processor used in copying machines, printers, scanners or the like, to read an original image represented on a paper sheet or the like and to subject this image to various processings and more particularly to an improved arrangement for incorporation of an electric motor serving to drive an original scanning carrier in such image processor.

2. Description of the Related Art

The function of a carrier in an image processor is to pick up an original image to be processed and to guide the image to an image processing unit such as CCD. To achieve such function, the carrier is provided with various optical elements such as reflectors so as to define an optical path extending from the original to the CCD. The carrier is moved along the original to scan it and thereby to pick up the image of the original. Specifically, the carrier is operatively associated with a given length of wire adapted to be taken up on a pulley which is, in turn, driven by an electric motor, so that the carrier is driven to scan the original as the wire is taken up on the pulley. The carrier is placed upon guide members horizontally extending within a housing of the image processor and slidably moved along the guide members.

FIG. 4 of the accompanying drawings is a perspective view of such an image processor, schematically showing the conventional arrangement for incorporation of the electric motor. A housing 1 contains therein a first carrier 2 and a second carrier 3 adapted to be moved over predetermined extents, respectively. These carriers 2 and 3 are moved for scanning as an electric motor 4 is rotated. More specifically, a loop of a belt 6 is draped on a driving pulley 4a fixed around an output shaft of motor 4, on one end, and on a driven pulley 5a fixed around a driving shaft 5, on the other end. Driving shaft 5 axially extends transversely of a direction in which carriers 2 and 3 are moved to scan the original and a driving mechanism for carriers 2 and 3 is actuated by rotation of driving shaft 5. Electric motor 4 is disposed externally of housing 1 as will be apparent from FIG. 4.

The conventional arrangement for incorporation of the electric motor as exemplary described above inevitably makes the image processor bulky as a whole because electric motor 4 is disposed externally of housing 1. This is inconvenient also in view of a fact that the image processor requires a correspondingly large space for its installation. Consequently, the place at which the image processor can be installed is limited due to the limited space available when used indoors.

SUMMARY OF THE INVENTION

In view of the problem as described above, it is a principal object of the invention to provide an improved arrangement for incorporation of the carrier driving electric motor in the image processor allowing the image processor to be made compact and thereby allowing a space required for installation of the image processor to be correspondingly reduced.

The object set forth above is achieved, according to the invention, by an image processor comprising an electric motor operatively associated with a driving shaft axially extending transversely of a direction in which a carrier is slidably driven by the driving shaft from its initial position to its predetermined position relative to an original to scan the original so that an image may be obtained and transferred from the original to an image processing unit such as a pick-up element. The electric motor is disposed within a housing of the image processor. Rotation of the electric motor is transmitted to a longitudinally intermediate portion of the driving shaft to rotate the driving shaft.

The electric motor may therefore be disposed internally of the housing to avoid an inconvenient condition whereby various components such as the electric motor and a mechanism used to transmit a driving force from the electric motor to the driving shaft might project outward from the housing. This improves the availability of a space for installation of the image processor.

The image processor generally employs a plurality of carriers adapted to be moved over respective predetermined distances so as to define an optical path from the original to the image processing unit. This means that at least one of these carriers is potentially moved over a relatively large distance. In order to make the image processor compact when the processor includes a carrier that is to be moved over a relatively large distance, the electric motor is disposed within a housing of the image processor below a scanning path defined by one of the carriers, and the rotation of the electric motor is transmitted to a longitudinally intermediate portion of the driving shaft to rotate the driving shaft.

Placement of the electric motor below the scanning range of the carrier allows the scanning range of the carrier to overlie the area occupied by the electric motor. Consequently, the horizontal dimensions of the housing are determined only by the scanning travel distances of the carriers. Thus, the image processor need not become bulky.

Slidable movement of the carrier(s) should be guided by suitable guide members. Assuming that these guide members comprise a pair of flat plates adapted to support thereon the carrier(s), the carrier(s) is (are) placed on guide members so as to be slidably driven on the guide members and the electric motor is disposed below the guide members.

Since the carrier(s) is (are) slidably driven on the guide members, the electric motor will not interfere with the scanning movement of the carrier(s) so long as the electric motor is disposed below these guide members.

The housing can be made more compact by reducing the height of the housing. According to the invention, this is achieved by forming a downward recess in a bottom plate of the housing at an appropriate location and disposing the electric motor within the downward recess. It is only this recess which projects downward from the housing's bottom plate and this does not substantially affect the thickness of the housing. This downward recess can be easily obtained using a drawing technique.

According to the present invention, the electric motor is preferably disposed behind the image processing unit. Specifically, the electric motor can be disposed at a desired location free from any limitation imposed by the optical path so long as the electric motor is disposed out of the optical path.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Details of the inventive image processor construction will be more fully understood from the following description of the preferred embodiments described below with reference to the accompanying drawings.

Figure 1:
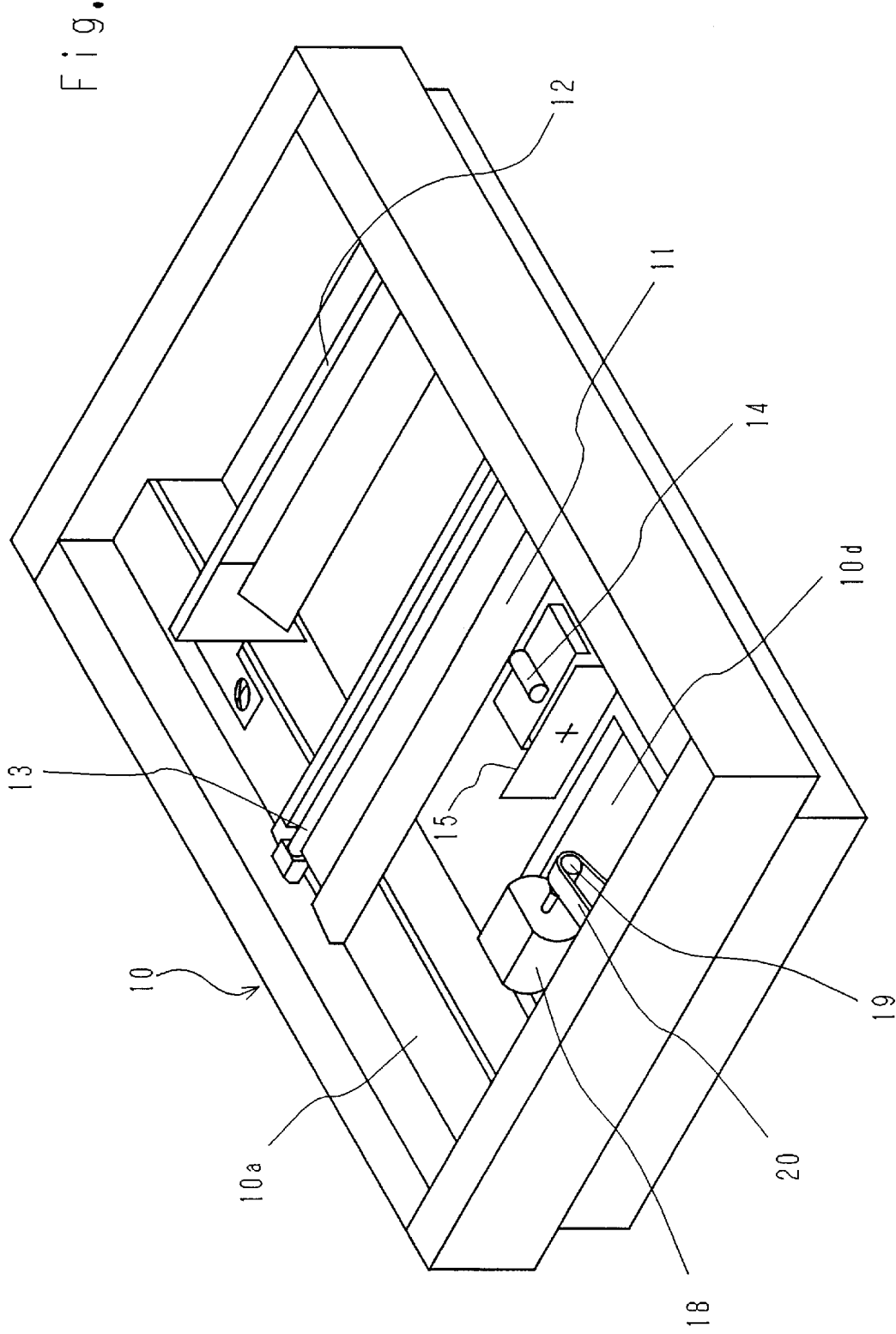
FIG. 1 is a schematic perspective view of an image processor constructed according to the present invention.
Figure 2:
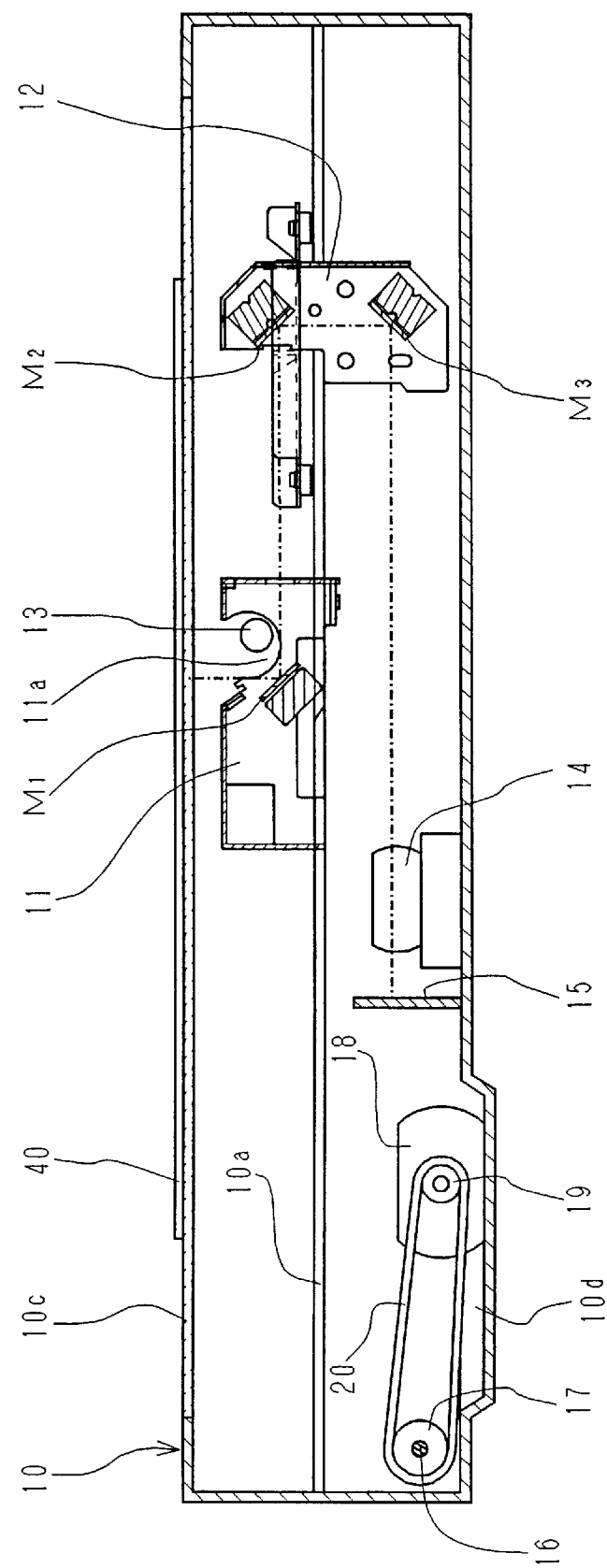
FIG. 2 is a schematic sectional view of an image processor constructed according to the present invention as taken along a vertical plane extending in a direction of scanning.

As shown in FIG. 1, guides 10a are formed in a substantially rectangular housing 10. Guides 10a take the form of steps extending inward from respective inner surfaces of transversely opposite side walls of housing 10. These guides 10a extend longitudinally in housing 10 so that a first carrier 11 and a second carrier 12 may be slidably mounted on guides 10a. As shown in FIG. 2, first carrier 11 is provided with a reflector M1 and second carrier 12 is provided with reflectors M2 and M3 so as to define an optical path serving to direct an image of an original 40 that is placed on transparent plate glass 10c supported on the upper end of the housing 10, to a lens 14. The image transmitted through lens 14 is focused on a CCD 15 serving as an image processing station comprising various elements such as an image pick-up element and thereby processed. A groove 11a is formed on an upper surface of first carrier 11. Groove 11a extends transversely of the direction of scanning. A lamp 13 is provided within groove 11a to illuminate the image of original 40, as shown in FIGS. 1 and 2.

Figure 3:
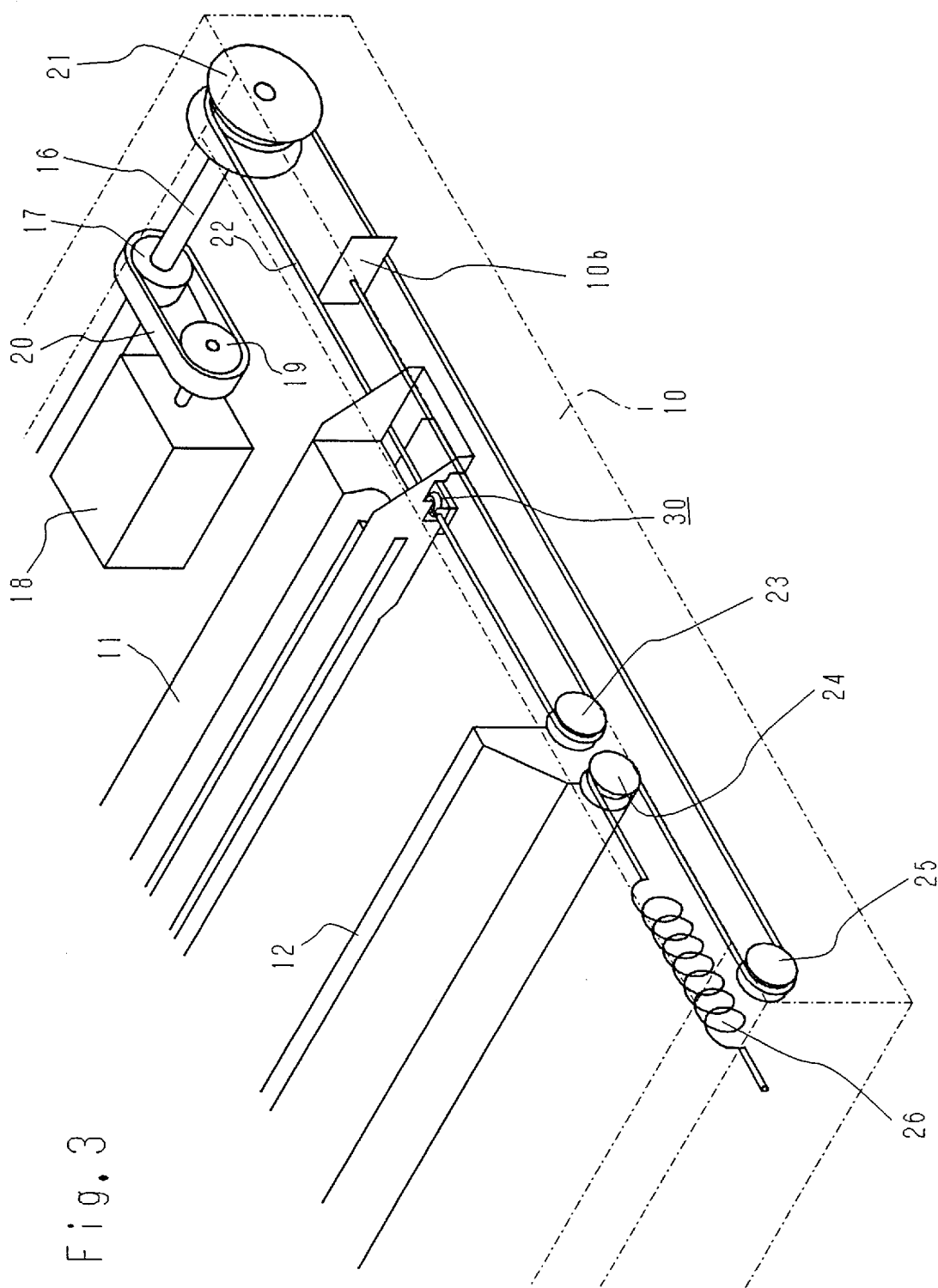
FIG. 3 is a schematic perspective view illustrating a carrier driving mechanism in the image processor of the present invention.
Figure 4:
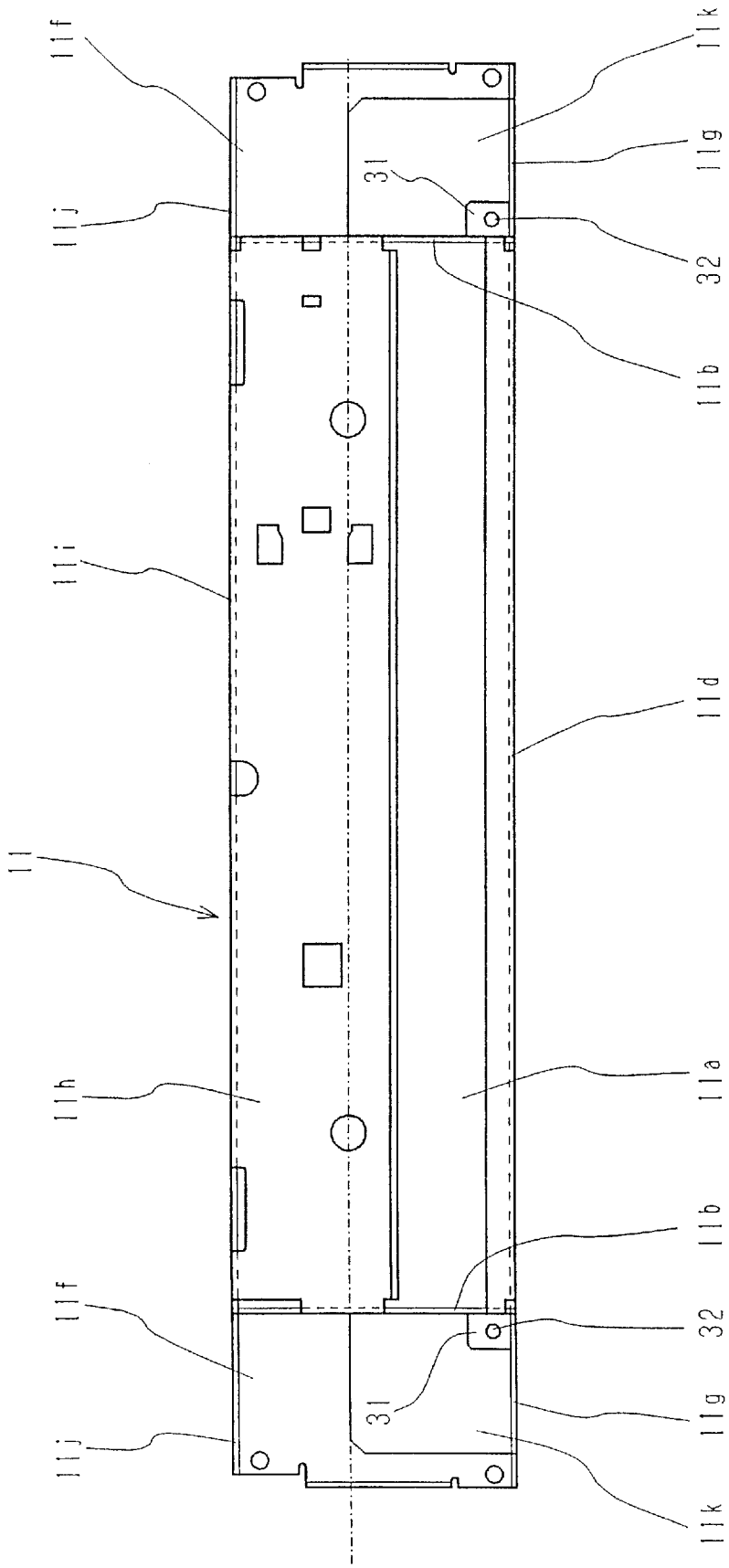
FIG. 4 is a view similar to FIG. 1 showing an example of a conventional construction for incorporation of an electric motor.

The image is read from original 40 as carriers 11 and 12 move along the original 40 to scan it. During this scanning movement, a predetermined relationship should be maintained between first carrier 11 and second carrier 12 so that a length of an optical path extending from original 40 to CCD 15 can be maintained constant. FIG. 3 illustrates a mechanism for driving first carrier 11 and second carrier 12. A driving shaft 16 having its axis orthogonal to the scanning direction of carriers 11 and 12 is rotatably supported by one of the longitudinally opposite ends of housing 10. A driven pulley 17 is fixed on driving shaft 16 at its longitudinal middle. A loop of driving belt 20 is draped on driven pulley 17, on one end, and on a driving pulley 19 fixed around an output shaft of an electric motor 18, on the other end. Driving shaft 16 carries on its longitudinally opposite ends take-up pulleys 21 adapted to be rotated together with driving shaft 16. An intermediate length of wire 22 is wound on each of pulleys 21 by an appropriate number of turns. A pair of guide pulleys 23 and 24 arranged side by side in the scanning direction are supported by second carrier 12 rotatably around their axes orthogonal to the scanning direction on each of its longitudinally opposite end surfaces. At an end of housing 10 opposite to the end rotatably supporting driving shaft 16, guide pulleys 25 are supported by housing 10 rotatably around their axes orthogonal to the scanning direction. Brackets 10b are provided on the respective side walls of housing 10 at appropriate locations. It should be understood that the respective pairs of take-up pulleys 21; wire 22; guide pulleys 23, 24, and 25; and brackets 10b are arranged within the housing 10 so as to be mutually opposed with a scanning zone therebetween.

The intermediate length of wire 22 wound on take-up pulley 21 has one end passing through means 30 operatively associated with first carrier 11, then guide pulley 23 and anchored on bracket 10b. The other end of wire 22 successively goes by way of said guide pulley 25 and 24 and is anchored on the side wall of housing 10 by elastic means 26 such as a tension coil spring.

As will be apparent from FIGS. 1 and 2, electric motor 18 is disposed within housing 10. A bottom plate of the housing defining a space to receive electric motor 18 is subjected, for example, to a drawing process to form a downward recess 10d so that an upper end of electric motor 18 never interferes with the scanning movement of first carrier 11.

The specific embodiment of the inventive image processor construction has been described above. The manner in which this embodiment operates is described below in connection with a scanning operation of carriers 11 and 12.

Scanning by carriers 11 and 12 is carried out as each of take-up pulleys 21 is rotated by actuation of electric motor 18 to take up wire 22 on each of take-up pulleys 21. Rotation of take-up pulleys 21, which is clockwise as viewed in FIG. 3, causes take-up pulley 21 to take up wire 22 and thereby causes first carrier 11 to move toward take-up pulley 21. Second carrier 12 moves one-half of the distance over which first carrier 11 moves since wire 22 goes by way of the guide pulleys 23 associated with second carrier 12 to the bracket 10b on which wire 22 is anchored. The differential movable distance of first carrier 11 and second carrier 12 is properly adjusted to maintain the predetermined length of the optical path extending from original 40 to CCD 15. Carriers 11 and 12 are adapted to move from their initial positions which are remote from take-up pulleys 21.

While electric motor 18 is disposed within housing 10, the upper end of electric motor 18 lies at a sufficiently low level to avoid interference with the scanning movement of first carrier 11 because electric motor 18 is disposed in downward recess 10d formed in a part of the bottom plate of housing 10. Placement of electric motor 18 within housing 10 is also advantageous in that any portions projecting outward from housing 10 can be eliminated and an outer size of housing 10 can be correspondingly reduced.

As will be apparent from the foregoing description, the inventive image processor construction allows any portions projecting outward from the housing to be eliminated and thereby allows the outer size of the housing to be correspondingly reduced, because the electric motor is provided within the housing. This allows, in turn, the outer size of the image processor to be reduced and thereby improves the availability of the space for installation of the image processor.

According to the image processor of the present invention, the electric motor is disposed in the downward recess formed in a part of the housing's bottom plate so that the upper end of the motor lies at a sufficiently low level to avoid its interference with the scanning movement of the carriers. In addition, the downward recess can be easily formed by a drawing process without taking much time and labor.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An image processor comprising:

a housing;

a carrier slidable in a scanning direction upon and between a pair of parallel, spaced apart guide members extending longitudinally within said housing to scan an original document;

an image pick-up unit disposed in said housing for receiving the scanned image of the original document from said carrier;

a driving shaft disposed in said housing between said pair of guide members and axially extending transversely of the scanning direction, said driving shaft drives said carrier from an initial position to a predetermined position relative to an original to scan the original document; and a driving electric motor operatively associated with said driving shaft, wherein said electric motor is disposed within said housing and between said pair of guide members for transmitting a rotational force to a longitudinally intermediate portion of said driving shaft to rotate said driving shaft.

2. The image processor as defined in claim 1 wherein said electric motor is disposed below said guide members.

3. The image processor as defined in claim 2, wherein said housing includes a bottom plate having a downward recess and wherein said electric motor is disposed within said downward recess.

4. The image processor as defined in claim 3, wherein said electric motor is disposed behind said image processing unit.

5. The image processor as defined in claim 2, wherein said electric motor is disposed behind said image processing unit.

6. The image processor as defined in claim 1, wherein said housing includes a bottom plate having a downward recess and wherein said electric motor is disposed within said downward recess.

7. The image processor as defined in claim 6, wherein said electric motor is disposed behind said image processing unit.

8. The image processor as defined in claim 1, wherein said electric motor is disposed behind said image processing unit.

9. An image processor comprising:

a housing;

a pair of carriers slidable in a scanning direction upon and between a pair of parallel, spaced apart guide members extending longitudinally within said housing and maintained in a predetermined relation with respect to one another to scan an original document;

an image pick-up unit disposed in said housing for receiving the scanned image of the original document from said carrier;

a driving shaft disposed in said housing between said pair of guide members and axially extending transversely of the scanning direction, said driving shaft drives said carriers from an initial position to a predetermined position relative to an original to scan the original document; and a driving electric motor operatively associated with said driving shaft, wherein said electric motor is disposed within said housing between said pair of guide members and below a scanning path defined by said carriers for transmitting a rotational force to a longitudinally intermediate portion of said driving shaft to rotate said driving shaft.

10. The image processor as defined in claim 9 wherein said electric motor is disposed below said guide members.

11. The image processor as defined in claim 10, wherein said housing includes a bottom plate having a downward recess and wherein said electric motor is disposed within said downward recess.

12. The image processor as defined in claim 11, wherein said electric motor is disposed behind said image processing unit.

13. The image processor as defined in claim 10, wherein said electric motor is disposed behind said image processing unit.

14. The image processor as defined in claim 9, wherein said housing includes a bottom plate having a downward recess and wherein said electric motor is disposed within said downward recess.

15. The image processor as defined in claim 14, wherein said electric motor is disposed behind said image processor unit.

16. The image processor as defined in claim 9, wherein said electric motor is disposed behind said image processing unit.

17. An image processor comprising:

a housing;

a carrier slidable in a scanning direction upon and between a pair of parallel, spaced apart guide members extending longitudinally within said housing to scan an original document;

an image pick-up unit disposed in said housing for receiving the scanned image of the original document from said carrier;

a driving shaft disposed in said housing and axially extending transversely of the scanning direction, said driving shaft drives said carrier from an initial position to a predetermined position relative to an original to scan the original document; and a driving electric motor operatively associated with said driving shaft, wherein said electric motor is disposed within said housing between said driving shaft and said image pick-up unit and proximate a longitudinally intermediate portion of the driving shaft for transmitting a rotational force to said longitudinally intermediate portion of said driving shaft to rotate said driving shaft.

* * * * *